US010455672B2

(12) United States Patent
Cho et al.

(10) Patent No.: US 10,455,672 B2
(45) Date of Patent: Oct. 22, 2019

(54) TIME-BASED LIGHTING CONTROL

(71) Applicant: Eaton Intelligent Power Limited, Dublin (IE)

(72) Inventors: Nam Chin Cho, Peachtree City, GA (US); Parth Joshi, Sugar Hill, GA (US); David George Watt, Forest Park, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/109,091

(22) Filed: Aug. 22, 2018

(65) Prior Publication Data

US 2019/0069381 A1    Feb. 28, 2019

Related U.S. Application Data

(60) Provisional application No. 62/549,292, filed on Aug. 23, 2017.

(51) Int. Cl.
*H05B 37/02* (2006.01)
*H05B 33/08* (2006.01)
*F21Y 115/10* (2016.01)

(52) U.S. Cl.
CPC ..... *H05B 37/0281* (2013.01); *H05B 33/0809* (2013.01); *H05B 33/0842* (2013.01); *H05B 33/0845* (2013.01); *H05B 33/0857* (2013.01); *H05B 33/0887* (2013.01); *F21Y 2115/10* (2016.08)

(58) Field of Classification Search
CPC ............ H05B 37/0281; H05B 37/0272; H05B 37/0227; H05B 33/0854; H05B 33/0845; H05B 33/0872; H05B 37/0218; H05B 33/0857; H05B 33/0869; H05B 33/0815; H05B 37/0245; H05B 33/0842; H05B 33/0803; H05B 37/0254; H05B 33/0827; H05B 33/086; H05B 33/0884; H05B 33/0812; H05B 33/0851; H05B 33/0866; H05B 37/0263; H05B 33/08; H05B 33/0806; H05B 37/02; Y02B 20/42; Y02B 20/346; Y02B 20/46; Y02B 20/383; Y02B 20/44; Y02B 20/341; Y02B 20/348; Y02B 20/386; Y02B 20/48; Y02B 20/14; Y02B 70/3283; F21K 9/238; F21K 9/60; F21K 9/00; F21V 23/045; Y10S 362/80; A61M 2021/0083; A61M 21/00; A61M 21/02
See application file for complete search history.

(56) References Cited

U.S. PATENT DOCUMENTS 8,896,215 B2 * 11/2014 Reed .................. H05B 37/0281
 315/126
9,936,556 B2 * 4/2018 Chraibi ............. H05B 33/0845
2003/0169641 A1 * 9/2003 O'Neill .................... G04G 3/00
 368/21

(Continued)

*Primary Examiner* — Vibol Tan
(74) *Attorney, Agent, or Firm* — King & Spalding LLP

(57) ABSTRACT

A lighting fixture includes a light emitting diode (LED) light source, a clock module, and a controller configured to control one or more characteristics of a light emitted by the LED light source based on time information received from the clock module. The controller is further configured to determine a current time of a day from the time information received from the clock module.

20 Claims, 5 Drawing Sheets

(56) References Cited

U.S. PATENT DOCUMENTS

| | | | |
|---|---|---|---|
| 2012/0299488 A1* | 11/2012 | Zhang | H05B 33/0818 315/186 |
| 2014/0062341 A1* | 3/2014 | Reed | H05B 37/0281 315/360 |
| 2014/0240692 A1* | 8/2014 | Tien | G01S 17/89 356/5.01 |
| 2016/0295658 A1* | 10/2016 | Chraibi | H05B 33/0845 |

* cited by examiner

TIME-BASED LIGHTING CONTROL

CROSS REFERENCE TO RELATED APPLICATIONS

The present application claims priority under 35 U.S.C. Section 119(e) to U.S. Provisional Patent Application No. 62/549,292, filed Aug. 23, 2017 and titled "Time-Based Lighting Control," the entire content of which is incorporated herein by reference.

TECHNICAL FIELD

The present disclosure relates generally to lighting control, and more particularly to controlling lighting based on time.

BACKGROUND

The color temperature and other characteristics of natural light change throughout the day and may be related to the circadian rhythm and the human body clock, for example, with respect to the production of melatonin. On the other hand, many lighting fixtures emit a light that has a fixed color temperature and other characteristics regardless of the time of day. In some cases, changing characteristics of a light emitted by a light fixture to more closely correlate with changes in natural light may be desirable. Further, changing characteristics of a light emitted by a light fixture based on one or more schedules may also be desirable. While some lighting fixtures provide the capability to adjust characteristics of the light provided by the lighting fixtures, these lighting fixtures generally require manual adjustments of the characteristics of the light such as manual adjustments of dim levels. Thus, in some applications, a solution that enables changing one or more characteristics of a light provided by a lighting fixture based on the time of day and/or time and date related schedules is desirable.

SUMMARY

The present disclosure relates generally to lighting control, and more particularly to controlling lighting based on current time. In an example embodiment, a lighting fixture includes a light emitting diode (LED) light source, a clock module, and a controller configured to control one or more characteristics of a light emitted by the LED light source based on time information received from the clock module. The controller is further configured to determine a current time of a day from the time information received from the clock module.

In another example embodiment, a lighting fixture includes a light emitting diode (LED) light source, a crystal, and a controller configured to keep track of a current time of a day based on a signal from the crystal and to control one or more characteristics of a light emitted by the LED light source based on the current time of the day.

In another example embodiment, a lighting fixture includes a light emitting diode (LED) light source configured to emit a light, a clock module, and an LED driver comprising a controller. The LED driver is configured to provide power to the LED light source, and the controller is configured to control an amount of the power provided to the LED light source. The controller is further configured to control one or more characteristics of the light based on time information received from the clock module.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
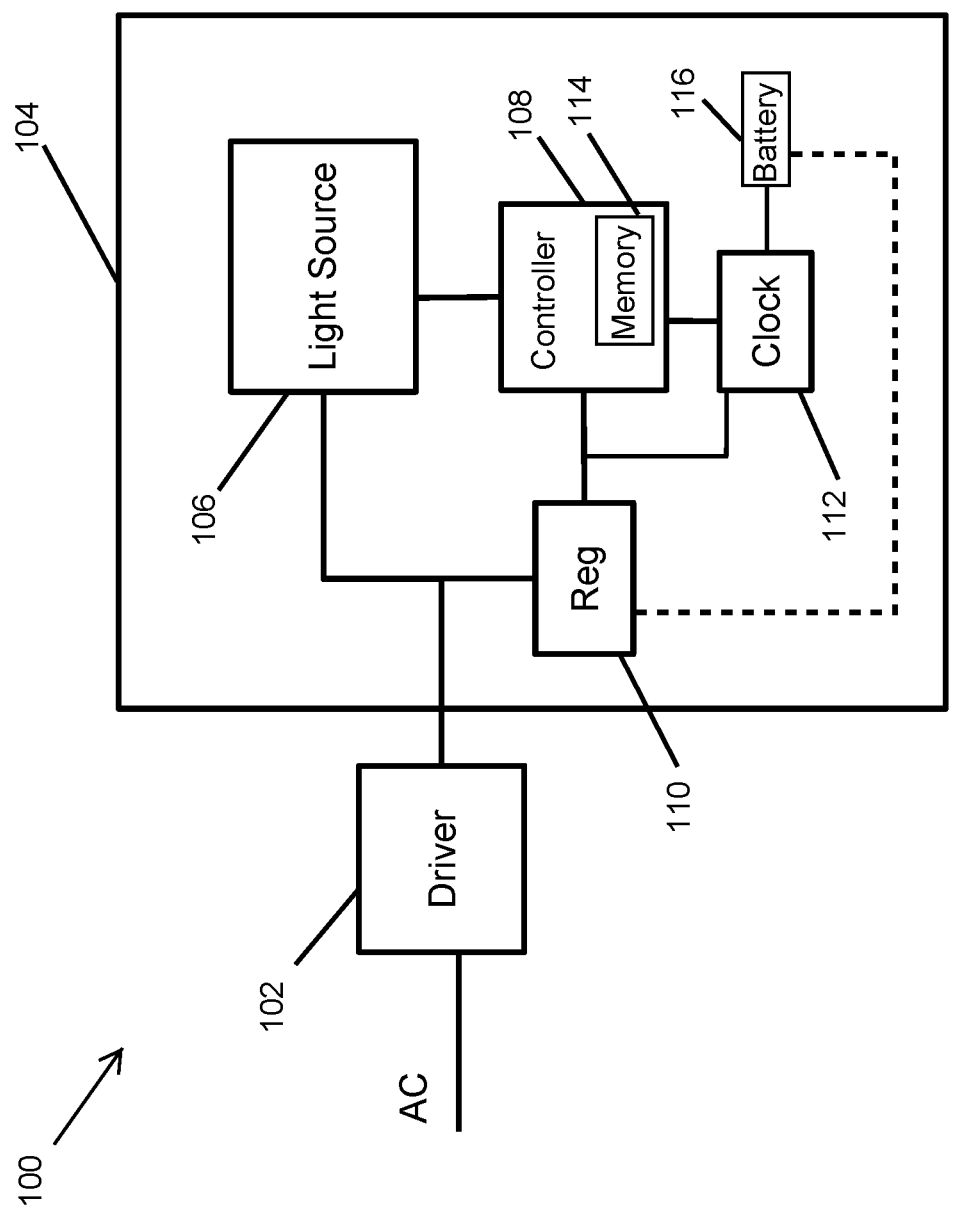
FIG. 1 illustrates a lighting fixture with a time-based controller according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a lighting fixture may track the time of day and change one or more characteristics (e.g., dim level, color temperature, hue, saturation, etc.) of the light provided by the lighting fixture. The lighting fixture may track the time of day and change one or more characteristics of the light, for example, consistent with the circadian rhythm. For example, the lighting fixture may be customized at the factory to provide the highest color temperature in the morning and gradually reduce the color temperature to the lowest color temperature reached at dusk. In some example embodiments, the lighting fixture may be programmed at the factory with one or multiple lighting control profiles. A lighting control profile may indicate lighting characteristics information with respect to different times of the day. In some example embodiments, the lighting fixture may be programmed by an installer or by an end user with one or multiple lighting control profiles. The lighting fixtures may also be programmed to operate according to one or more schedules of the lighting control profiles. For example, the schedules may be daily, weekly, or monthly schedules of multiple lighting control profiles. In some embodiments, a particular toggle sequence of a light switch that controls power to a lighting fixture may be used to set the time of day, for example, at the initial installation of the lighting fixture and/or after installation of the lighting fixture as described in more detail with respect to FIG. 4.

Turning now to the figures, example embodiments are described. FIG. 1 illustrates a lighting fixture 100 with a time-based controller 108 according to an example embodiment. In some example embodiments, the lighting fixture 100 includes a driver 102, a light source 106, the controller 108, and a clock module 112. The light source 106, the controller 108, and the clock module 112 may be disposed on a circuit board 104.

In some example embodiments, the lighting fixture 100 may also include a voltage regulator 110 that provides an appropriate voltage level (e.g., 3.3 V) to the controller 108 and other components on the board 104. The driver 102 may be an LED driver that receives an AC power and that provides DC power to the light source 106. In some alternative embodiments, the regulator 110 may be omitted, and the driver 102 may provide the appropriate voltage level to the controller 108 and other components.

In some example embodiments, the clock module 112 may provide time information (e.g., the current time) to the controller 108, for example, in a digital signal format, i.e., using one or more digital signals. Alternatively, the clock module 112 may provide time information to the controller 108 using one or more analog signals. The clock module 112 may provide time information to the controller via a serial or parallel connection using respective serial or parallel signals. The clock module 112 may include an atomic clock or another type of clock along with other components to provide the time information to the controller 108. Alternatively, the clock module 112 may include a real time clock module that provides time information (e.g., the current time) to the controller 108. For example, the clock module 112 may include a real time clock integrated circuit and other associated components such as a crystal similar to the crystal described below with respect to FIG. 4. To illustrate, the clock module 112 may include a real time clock integrated circuit, such as DS1341 or DS1308 integrated circuits from Maxim Integrated or similar products from ST Microelectronics or other real time clock integrated circuit makers. In some example embodiments, the clock module 112 may also include a processor unit as well as other components such as one or more counters, memory elements, etc. separate from the real time clock integrated circuit to operate in conjunction with the real time clock integrated circuit to keep time and provide the time information to the controller 108. In some example embodiments, the clock module 112 may be set or may be reset (e.g., via a physical input such as a switch) to a particular preset time, and the clock module 112 may start keeping track of time starting with the particular present time.

In some example embodiments, the time information from the clock module 112 may indicate the time of the day to the controller 108. For example, the time information may indicate the time of the day based on hours, minutes, and seconds. To illustrate, the controller 108 may receive from the clock module 112 hour information, minute information, and second information on separate inputs of the controller 108. In some alternative embodiments, the time information provided by the clock module 112 may include the hour information without minutes and seconds information. In some alternative embodiments, the time information provided by the clock module 112 may include the hour and the minutes information and no seconds information. As a non-limiting example, the clock module 112 may indicate that the time is 7:15 A.M. by providing "7" as the hour and "15" as the minute using digital or analog signals that are provided to the controller 108. As another non-limiting example, the clock module 112 may indicate that the time is 5:25 P.M. by providing "17" as the hour and "25" as the minute based on a 24-hour format.

In some example embodiments, the clock module 112 may be powered by the regulator 110. Alternatively or in addition, the clock module 112 may be powered by a battery 116. For example, the battery 116 may enable the clock to continue to keep time even when power from the regulator is unavailable. In some example embodiments, the battery 116 may be a rechargeable battery that is charged by the driver 102 or by the regulator 110. Alternatively or in addition, the battery 116 may be a replaceable battery. In some alternative embodiments, the battery 116 may be omitted or integrated in the clock module 112.

In some example embodiments, the controller 108 may include a microcontroller or a microprocessor. The controller 108 may also include a memory device 114, such as a non-volatile memory device (e.g., flash memory), that is used to store code that is executed by the controller 108. In some alternative embodiments, the memory device 114 may be external to controller 108. The memory device 114 may also be used to store data, such as data used or generated by the controller 108. The controller 108 may execute code and use the data stored in the memory device 114 to control one or more characteristics (e.g., dim level, color temperature, hue, saturation, etc.) of the light emitted by the light source 106.

Figure 2:
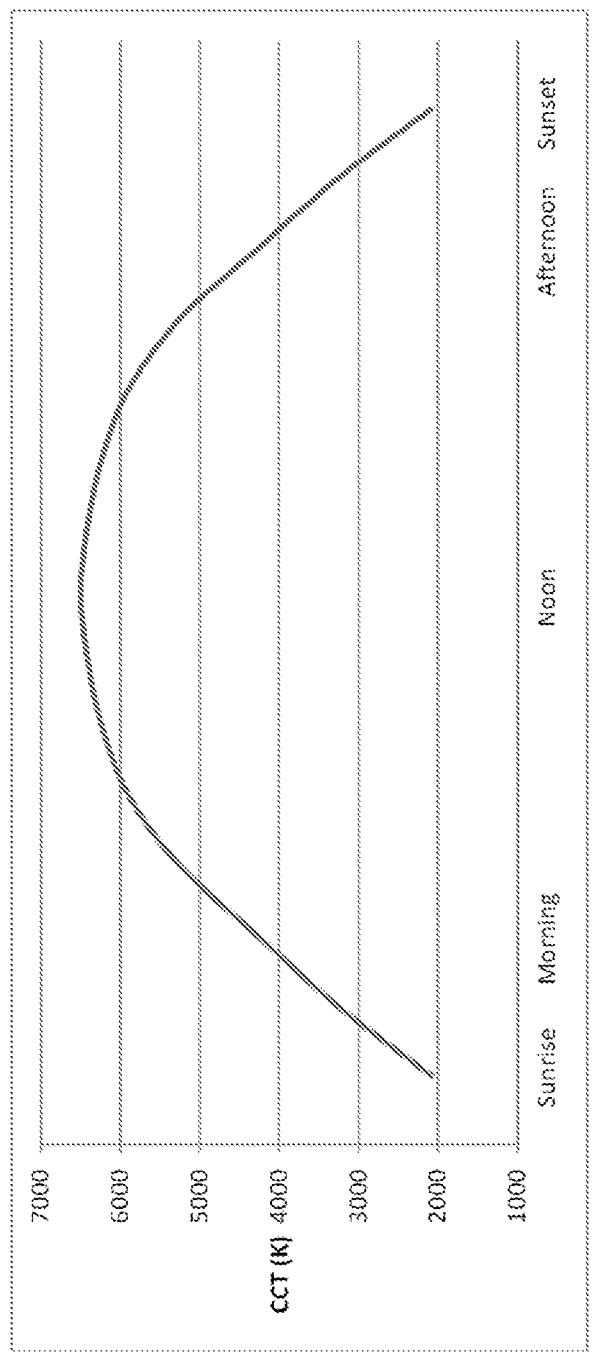
FIG. 2 illustrates an example Correlated Color Temperature curve according to an example embodiment.

In some example embodiments, the controller 108 may receive time information from the clock module 112 and control the light source 106 to set/adjust the color temperature and/or other characteristics of the light emitted by the light source 106 based on the time of the day indicated by time information from clock module 112. For example, the controller 108 may control the light source 106 to emit a cooler light in the morning and a warmer light in the evening. For example, the controller 108 may control the light source 106 such that the color temperature of the emitted light generally tracks the example Correlated Color Temperature curve shown in FIG. 2. In some alternative embodiments, the color temperature of the emitted light may track a different curve or pattern.

In some example embodiments, the controller 108 may control the light source 106 to change the color temperature and/or other characteristics (e.g., dim level) of the emitted light smoothly throughout the day based on the time of day indicated by the time information from the clock module 112. For example, the color temperature and/or other characteristics of the light may change every 5 minutes, every 15 minutes, or every 30 minutes throughout the day. As another example, the color temperature and/or other characteristics of the light may change every hour throughout the day. The color temperature and/or other characteristics of the light may also change at intervals during different times of the day. In addition to changing the color temperature and/or other characteristics smoothly, in some alternative embodiments, the controller 108 may control the light source 106 to change the color temperature and/or other characteristics of the emitted light abruptly, for example, at particular times of the day. A lookup table mapping different times of a day with corresponding color temperature and/or other characteristics of the light may be stored in the memory device 114.

In some example embodiments, the controller 108 may control the light source 106 based on the time information provided by the clock module 112 to adjust one or more other characteristics of the light emitted by the light source 106 without adjusting the color temperature of the light. For example, the controller 108 may control the light source 106 to adjust the dim level of the light based on time of the day without adjusting the color temperature based on the time of the day, although some limited changes in the color temperature may occur as a consequence of the change in dim level or other characteristics. In some example embodiments, the controller 108 may control the light source 106 to adjust the color temperature of the light based on time of the day without adjusting the dim level or other characteristics of the light based on the time of the day, although some limited changes in the dim level or other characteristics may occur as a consequence of the change in color temperature.

In some example embodiments, the controller 108 may be programmed at the factory with one or multiple lighting control profiles. Alternatively, the lighting fixture may be programmed by an installer or by an end user with one or multiple lighting control profiles. To illustrate, the controller 108 may be programmed with a default profile that is used unless another profile is loaded and/or selected. For example, the one or more lighting control profiles may be stored in the memory device 114.

In some example embodiments, a default or another lighting control profile may include the following information: 5000 K from 7 A.M. to 9 A.M.; 5000 K from 9 A.M. to 12 P.M.; 4000 K from 12 P.M. to 3 P.M.; 3500 K from 3 P.M. to 5 P.M.; 3000 K from 5 P.M. to 8 P.M.; 2700 K from 8 P.M. and 5 A.M.; and 3500 K from 5 A.M. to 7 A.M. The controller 108 may control the light source 106 based on the profile and the time information received from the clock module 112.

As another example, a default or another lighting control profile may include the following information: gradual change of color temperature from 3500 K to 5000 K from 7 A.M. to 9 A.M.; maintain color temperature at 5000 K between 9 A.M. and 12 P.M.; gradual change of color temperature from 5000 K to 2700 K from 12 P.M. to 8 P.M.; maintain color temperature at 2700 K between 8 P.M. and 5 A.M.; and gradual change of color temperature from 2700 K to 3500 K from 5 A.M. to 7 A.M. Gradual change in color temperature may follow a linear curve (e.g., a fixed amount, for example, approximately 125 K, every fixed period of time, for example, 10 minutes). Alternatively, gradual change in color temperature may follow a non-linear curve where the color temperature is changed by different amounts every fixed period of time or varying intervals of time. Alternatively or in addition, gradual change in color temperature may follow a non-linear curve where the color temperature is changed by the same amount at varying intervals of time. The lighting control profile may include the rate of gradual change of the color temperature. One or more lighting control profiles may also include similar adjustment information related to dim level and/or other lighting characteristics instead of or in addition to color temperature adjustment information.

In some example embodiments, the controller 108 may also be programmed to operate the lighting fixture 100 according to a schedule of lighting control profiles. For example, a schedule may be a weekly schedule of multiple lighting control profiles. To illustrate, a schedule may include the following information: profile #1 for Monday to Friday; profile #2 for Saturday; and profile #3 for Sunday, where the three profiles may be different from each other and may be loaded to the controller 108 at the factory, during installation, or after installation. In some example embodiments, the schedule of profiles may be more or less frequent than a weekly schedule. In some example embodiments, the controller 108 may be programmed with multiple schedules of profiles. For example, the profiles and the schedules of profiles may be stored in the memory device 114. The profiles and the schedules loaded to the controller 108 may be selectable by a user, for example, using a mobile device that includes an applicable control application as can be understood by those of ordinary skill in the art with the benefit of this disclosure.

In some example embodiments, the controller 108 may change the one or more characteristics of the light emitted by the light source 106 based on one or more wireless signals received by the controller or another component of the lighting fixture 100. For example, a mobile device executing an application, such as a lighting control application, may send wireless signals, directly or through one or more network devices, to the lighting fixture 100. The controller 108 may include a receiver or a transceiver that receives wireless signals that are compliant with one or more wireless communication standards, such as Wi-Fi, Bluetooth, BLE, ZigBee, or a proprietary standard. To illustrate, the controller 108 may change rates of changes and schedules of changes of one or more characteristics of the light (e.g., a color temperature) of the light based on one or more signals received wirelessly by the lighting fixture 100. For example, the one or more signals received by the lighting fixture 100 may indicate a user selection of one of already loaded lighting control profiles. As another example, the one or more signals received by the lighting fixture 100 may indicate a user selection of one of already loaded schedules of lighting control profiles.

In some example embodiments, the one or more signals received by the lighting fixture 100 may provide one or more lighting control profiles and/or schedules of profiles to be stored in the controller 108. Alternatively or in addition, the one or more signals received by the lighting fixture 100 may provide a lighting control profile to be actively used by the controller to control the light source 106 based on the time information from the clock module 112. For example, the lighting fixture 100 may receive Bluetooth or other wireless signals (for example, from a mobile device) that configure the controller 108 to change the color temperature of the light according to the following lighting control profile: gradually change the color temperature from 3500 K to 5000 K from 7 A.M. to 9 A.M.; maintain the color temperature at 5000 K between 9 A.M. and 12 P.M.; gradually change the color temperature from 5000 K to 2700 K from 12 P.M. to 8 P.M.; maintain the color temperature at 2700 K between 8 P.M. and 5 A.M.; and gradually change the color temperature from 2700 K to 3500 K from 5 A.M. to 7 A.M. The controller 108 uses the lighting control profile along with the time information to adjust the color temperature of the light provided by the light source 106. To illustrate, when operating based on the above profile, the controller 108 may control the light source 106 to emit a light that has 5000 K color temperature when the time information indicates the time is between 9 A.M. and 12 P.M. In some example embodiments, the one or more signals received by the lighting fixture 100 may indicate the current time and the controller 108 and/or the clock module 112 may keep track of time using the current time indicated by the signals as a reference.

By adjusting characteristics of the light provided by the light source 106 based on the time information from the clock module 112 and a lighting control profile, the controller 108 can adjust light to more closely match or correspond to some characteristics of natural light. Because lighting control profiles can be tailored to individual preferences or areas with different natural lighting conditions (e.g., a normally relatively dark room during some times of a day), the lighting control profiles along with the time information from the clock module 112 may be used to adjust the light from the light source 106 to more closely match individual preferences and different areas.

In some alternative embodiments, the clock module 112 may be omitted or integrated in the controller 108, and a software-based clock ("soft clock") may be implemented by the controller 108 or by the clock module 112 as part of the controller 108 operations. For example, the controller 108 may receive a user input to set the current time and the controller 108 may execute software code to keep time based on the run clock signal provided to the controller 108. The controller 108 with the integrated clock module may keep time starting from the time set by the user. In some alternative embodiments, some components of the lighting fixture 100 may be integrated into a single component. In some example embodiments, the lighting fixture 100 may include other components without departing from the scope of this disclosure. In some example embodiments, the components of the lighting fixture 100 may be connected in a different configuration than shown without departing from the scope of this disclosure.

Figure 3:
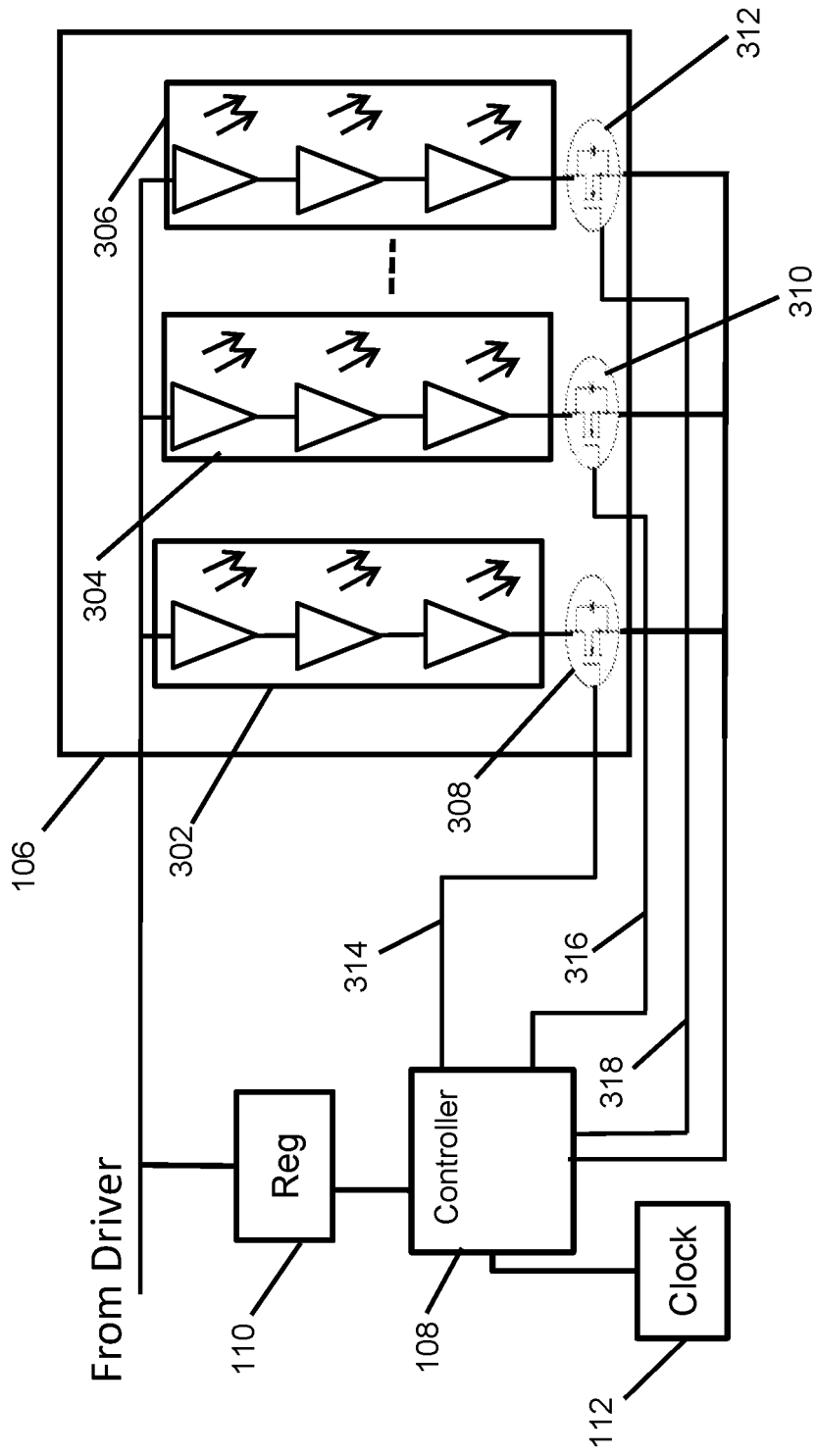
FIG. 3 illustrates the lighting fixture of FIG. 1 including a time-based controller coupled to the light source that has multiple LED groups according to an example embodiment.

FIG. 3 illustrates the lighting fixture 100 including the time-based controller 108 coupled to the light source 106 that has multiple LED groups according to an example embodiment. Referring to FIGS. 1 and 3, the lighting fixture 100 includes the light source 106, the controller 108, the regulator 110, and the clock 112. The light source 106 may include LED groups 302, 304, 306. Each LED group 302, 304, 306 includes one or more LEDs that emit a respective light that are combined to produce the light provided by the light source 106. Each LED group 302, 304, 306 may include discrete LEDs, organic light emitting diodes (OLEDs), an LED chip on board that includes discrete LEDs, an array of discrete LEDs, or another arrangement of LEDs.

In some example embodiments, each LED groups 302, 304, 306 may emit a respective light that has one or more characteristics that are different from the respective one or more characteristics of the lights emitted by the other two from among the LED groups 302, 304, 306. For example, the LED group 302 may emit a light that has a color temperature that is different from the color temperature of the lights emitted by the LED groups 304, 306. The LED group 304 may emit a light that has a color temperature that is different from the color temperature of the lights emitted by the LED groups 302, 306. For example, the light emitted by the LED group 302 may have a cool color temperature (e.g., 6500 K), the light emitted by the LED group 304 may have a mid-range color temperature (e.g., 4000 K), and the light emitted by the LED group 306 may have a warm color temperature (e.g., 2700 K).

In some example embodiments, the controller 108 may control the amount of current that flows through each LED group 302, 304, 306 based on the time information provided by the clock module 112 and the selected lighting control profile (or the received lighting control profile) to adjust the color temperature and/or other characteristics of the light provided by the light source 106. To illustrate, current flow through the LED group 302 may be controlled by the controller 108 by controlling a transistor 308 (e.g., a MOSFET) that is in series with the LED group 302. The controller 108 may control current flow through the LED group 304 by controlling a transistor 310 (e.g., a MOSFET) that is in series with the LED group 304. The controller 108 may control current flow through the LED group 306 by controlling a transistor 312 (e.g., a MOSFET) that is in series with the LED group 306.

In some example embodiments, the controller 108 may control the current flow through LED group 302 using a control signal provided to the transistor 308 via a connection 314 (e.g., a wire or trace). The controller 108 may control the current flow through LED group 304 using a control signal provided to the transistor 310 via a connection 316 (e.g., a wire or trace). The controller 108 may control the current flow through LED group 306 using a control signal provided to the transistor 312 via a connection 318 (e.g., a wire or trace).

In some example embodiments, the control signals provided to the transistors 308, 310, 312 may be pulse width modulation (PWM) signals. By varying the pulse width of the control signal, the controller 108 can control the average currents through the LED groups 302, 304, 306. For example, the controller 108 may increase the amount of current through the LED group 302 and reduce the amount of current through the LED group 306 to make the light provided by the light source 106 cooler (e.g., closer to 6500 K of the light provided by the LED group 302), for example, when transitioning from night time to day time. As another example, the controller 108 may reduce the amount of current through the LED group 302 and increase the amount of current through the LED group 306 to make the light provided by the light source 106 warmer (e.g., closer to 2700 K), for example, when transitioning from day time to evening time.

In some alternative embodiments, the control signals provided by the controller 108 to the transistors 308, 310, 312 may be signals other than PWM signals. For example, the controller 108 may include one or more digital-to-analog converter circuits that generate analog signals that are provided to the transistors 308, 310, 312 as control signals and that control current flow through the LED groups 302, 304, 306 by controlling the resistance of each of the transistors 308, 310, 312. In some alternative embodiments, the controller 108 may control the amount of current that flows through each LED group 302, 304, 306 in a different manner without departing from the scope of this disclosure.

In some example embodiments, a circuit component that can operate as a switch may be used instead of the transistor 308, 310, 312 to control current flow through the LED groups 302, 304, 306. In some alternative embodiments, each transistor 308, 310, 312 may be coupled to the respective LED group in a different configuration than shown without departing from the scope of this disclosure. In some alternative embodiments, a different type of transistor than shown may be used without departing from the scope of this disclosure.

In some alternative embodiments, the circuit 300 may include fewer or more LED groups than shown. In some alternative embodiments, each LED group may include more or fewer LEDs than shown. In some alternative embodiments, the LEDs in each LED group may be coupled in a different configuration than shown. In some alternative embodiments, the LED groups may be coupled to each other in a different configuration than shown. In some example embodiments, the components of the lighting fixture 300 may be connected in a different configuration than shown without departing from the scope of this disclosure.

Figure 4:
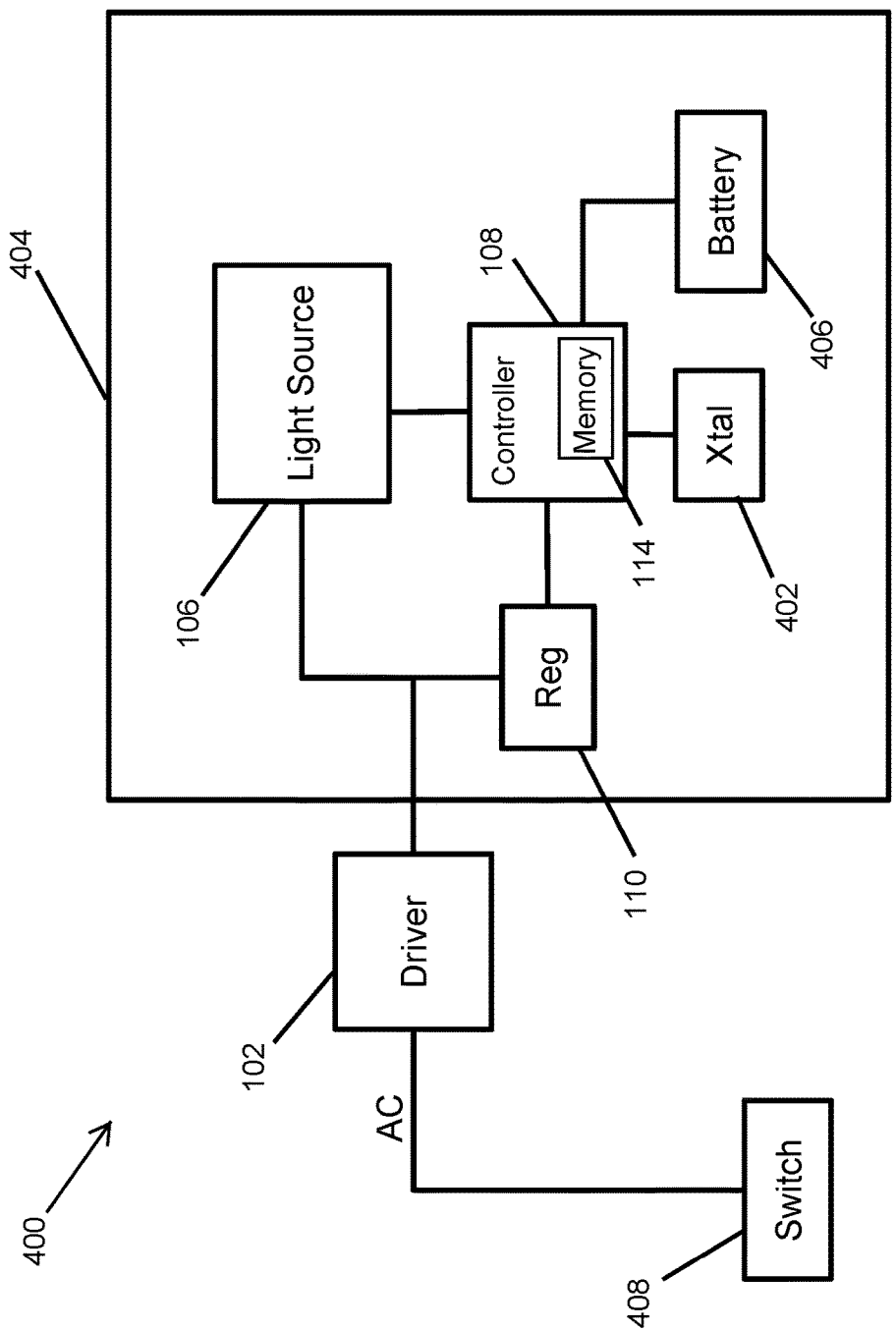
FIG. 4 illustrates a lighting fixture with a time-based controller according to another example embodiment.

FIG. 4 illustrates a lighting fixture 400 with a time-based controller according to another example embodiment. The lighting fixture 400 controls the light source 106 to adjust one or more characteristics (e.g., dim level, the color temperature, etc.) of the light emitted by the light source 106 in a similar manner as described with respect to FIGS. 1-3. For example, the lighting fixture 400 includes the driver 102, the light source 106, the controller 108, and the regulator 110. In contrast to the lighting fixture 100 of FIG. 1, the clock module 112 is omitted from the lighting fixture 400. Instead, the lighting fixture 400 may include a crystal 402 (e.g., a quartz crystal) that generates an electrical signal having a frequency (e.g., 32,768 Hz) that can be used by the controller 108 to track time throughout the day. For example, the crystal 402 and the controller 108 together may operate as a real time clock. In some example embodiments, the light source 106, the controller 108, and a battery 406 may be disposed on a circuit board 404.

In some example embodiments, the driver 102 may be an LED driver that receives an AC power and provides DC power to the light source 106. A switch 408 may control the availability of the AC power to the driver 102. The voltage regulator 110 may receive DC power from the driver 102 and provide the appropriate voltage level (e.g., 3.3 V) to the controller 108 and other components on the board 404. In some alternative embodiments, the regulator 110 may be omitted, and the driver 102 may provide the appropriate voltage level to the controller 108 and other components.

In some example embodiments, the battery 406 may provide power to the portion of the controller 108 that interfaces with the crystal 402. The battery 406 enables the crystal 402 and related portions of the controller to continue to keep time when the power from the driver 102 in not available. For example, the power from the driver 102 may be unavailable when a switch 408 is off. The battery 406 may be charged by the driver 102 or the regulator 110.

In some example embodiments, the controller 108 may be configured to start keeping time at power up starting from a default time (e.g., 12:00 P.M.) regardless of the actual time of the day. The controller 108 may need to be set with the current time or another time (if the user chooses to do so), for example, following the initial installation of the lighting fixture 400 or if the battery 406 is replaced. For example, the controller 108 may control the light source 106 based on a lighting control profile, such as one of the profiles described with respect to FIG. 1. Configuring the controller 108 with an accurate time may be necessary for accurate operations of the controller 108 when using a lighting control profile that provides lighting adjustment information relative to times of the day.

In some example embodiments, the controller 108 may be configured to interpret a particular sequences of toggles of the switch 408 (thus, sequences of toggles of power provided to the lighting fixture 400) as indicating a particular timed of a day. For example, the controller 108 may be configured to interpret a particular sequence of toggles of the switch 408 as indicating one particular time of a day (e.g., 7:00 A.M.) and interpret another particular sequence of toggles of the switch 408 as indicating another one particular time of a day (e.g., 12:00 P.M.). As an illustrative example, a user may toggle the switch 408 to on, followed by toggles to off and back to on within a threshold time period (e.g., 2 seconds) to indicate to the lighting fixture 400 that the current time is, for example, 7:00 A.M. or another time that the controller 108 is configured to associate the particular toggle sequence. The current time information as determined from the toggle sequence may be used by the controller 108 and/or the clock module 112 as a basis or a reference time to keep track of time of a day as well as changes of days.

One or more characteristics of the light emitted by the light source 106 may be changed by the controller 108 based on the newly set time. For example, upon detection of a particular toggle sequence, the controller 108 may set the current time to a particular time, the controller 108 may also control the light source 106 to emit a light that has a particular color temperature (e.g., 3500 K), dim level (e.g., 1200 lumens), and/or other characteristics such as hue and saturation. Alternatively or in addition, the controller 108 may use a lighting control profile stored in the memory device 114 or received, wirelessly or via a wired connection, to control the light source 106 based on the time associated with the particular toggle sequence.

As another example, the number of quick toggles (e.g., six toggles in 3 seconds) of the switch may indicate that the time is, for example, 9:00 A.M., and that the color temperature of the light should have the highest setting. The controller 108 may determine that the switch 408 is toggled on or off based on the availability of power from the driver 102 or from the regulator 110 (when the regulator 110 is present). For example, the portion of the controller that is powered by the battery 406 may identify the toggle sequence. The controller 108 may keep track of toggles and durations of off times and/or on times by operating on battery power during times that the power from the regulator 110 or the driver 102 is off. Alternatively, the controller 108 may continuously keep track of the time duration that the power from the driver 102 or the regulator 110 is available, for example, by storing the information in the non-volatile memory 114 of the controller 108, to identify a particular toggle sequence of the switch 408. For example, the controller 108 may detect power toggles to on and to off based on voltage levels to identify different power on durations.

After the controller 108 is set with the current time, the controller 108 continues to keep the correct time based on the signal from the crystal 402. The controller 108 uses the time information to control the light source 106 to change one or more characteristics (e.g., dim level, the color temperature, etc.) of the emitted light in a similar manner as described above with respect to the lighting fixture 100 of FIG. 1. For example, the controller 108 may control the light source 106 to emit a cooler light in the morning and a warmer light in the evening. For example, the controller 108 may control the light source 106 such that the color temperature of the emitted light closely tracks the example Correlated Color Temperature curve shown in FIG. 2.

In some example embodiments, the controller 108 may control the light source 106 based on the time information to adjust other characteristics of the light emitted by the light source 106. For example, the controller 108 may control the light source 106 to adjust the dim level of the light based on time of the day.

In some example embodiments, the battery 406 may be a rechargeable battery that is charged by power from the driver 102 or by the regulator 110. Alternatively or in addition, the battery 406 may be a replaceable battery. In some alternative embodiments, the battery 406 may be neither rechargeable nor replaceable.

In some alternative embodiments, the current time may be provided to the controller by means other than toggling the switch 408 without departing from the scope of this disclosure. In some alternative embodiments, a separate component may provide time information to the controller 108 in a similar manner as described with respect to the clock module 112 of the lighting fixture 100. For example, the crystal 402 and the battery 406 may be coupled to a real time clock module that generates and provides current time to the controller 108.

In some example embodiments, the lighting fixture 100 of FIG. 1 may detect toggles and toggle sequences and set the current time and/or light characteristics in the same manner as described above with respect to the lighting fixture 400. In some alternative embodiments, some components of the lighting fixture 400 may be integrated into a single component. The lighting fixture 400 may include other components without departing from the scope of this disclosure. In some example embodiments, the components of the lighting fixture 100 may be connected in a different configuration than shown without departing from the scope of this disclosure.

Figure 5:
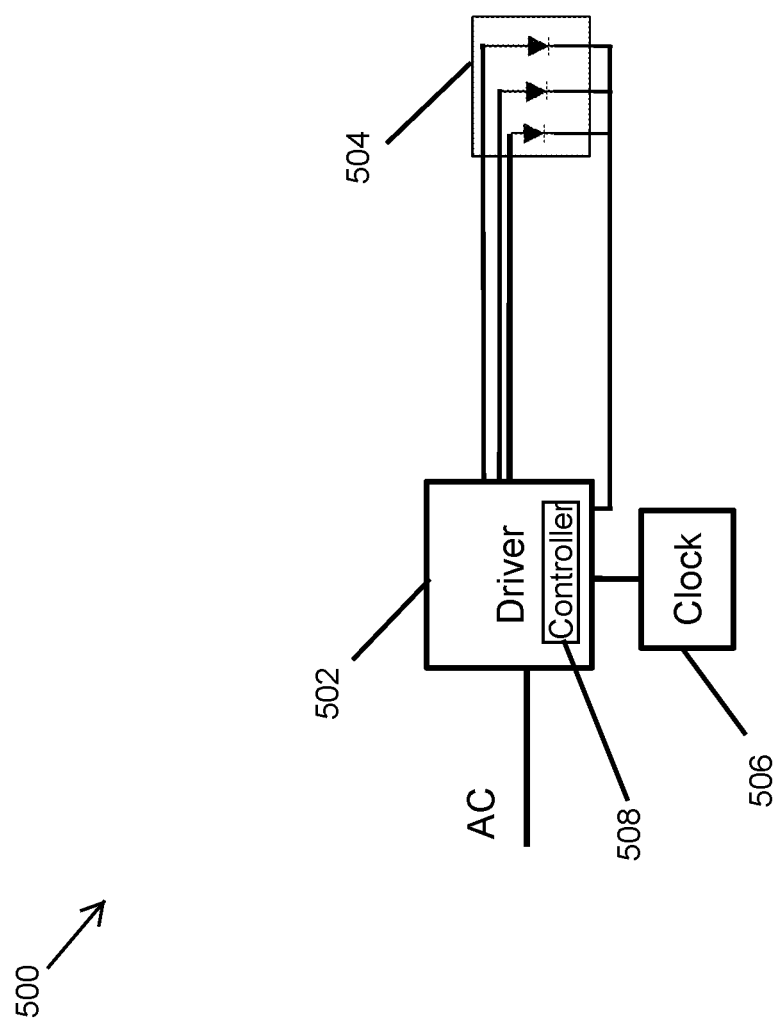
FIG. 5 illustrates a lighting fixture with a time-based controller integrated in a driver according to another example embodiment.

FIG. 5 illustrates a lighting fixture 500 with a time-based controller 508 integrated in a driver 502 according to another example embodiment. The lighting fixture 500 may include the driver 502, a light source 504, and a clock module 506. For example, the driver 508 may operate in a similar manner as the driver 108 described above. To illustrate, the driver 508 may include a memory device similar to the memory device 114 that can be used in a similar manner as described above with respect to FIGS. 1-3. In some example embodiments, the clock module 506 may correspond to the clock module 112 described above. For example, the lighting fixture 500 may include the battery 116 of the lighting fixture 100 and that is connected to the clock module 112 in a similar manner as shown in FIG. 1. The battery 116 may provide backup power to the clock module 112 when AC power is turned off or otherwise unavailable.

In some example embodiments, the light source 504 may include multiple LED groups that emit lights that have different respective characteristics (e.g., color temperature) from each other. For example, the color temperature of the light provided by the light source 504 may depend on the intensity level of the light from each LED group of the light source 504. The intensity level of the light provide by each group of LEDs may be controlled by controlling the power provided to each group. By controlling the power provided to each group of LEDs, the light source 504 may be controlled to emit a light that has a CCT, an intensity level, and/or other characteristics that closely match a desired CCT, intensity level, etc.

In some example embodiments, the light source 504 may include the LED groups 302, 304, 306 described above with respect to FIG. 3. Alternatively, the light source 504 may include other groups of LEDs that are arranged in similar or different configurations than the LED groups 302, 304, 306. In some example embodiments, one of the LED groups of the light source 504 may emit a warm white light (e.g., 2700 K), another one of the LED groups of the light source 504 may emit a cool white light (e.g., 5000 K), and yet another one of the LED groups of the light source 504 may emit a white light that has a CCT (e.g., 3500 K) that is between the CCT of the warm white light and the CCT of the cool white light. In some example embodiments, the light source 504 may include fewer or more LEDs and LED groups than shown in FIG. 5 without departing from the scope of this disclosure.

In some example embodiments, the driver 502 may control one or more characteristics (e.g., dim level, the color temperature, etc.) of the light provided by the light source 504 by controlling the power provided to each LED group of the light source 504. For example, the driver 502 may be a multi-channel driver that provides power to the light source 504 using multiple electrical connections (e.g., wires or traces) that are each connected to a respective LED group of the light source 504.

In some example embodiments, the driver 502 may control one or more characteristics (e.g., dim level, the color temperature, etc.) of the light provided by the light source 504 based on the time of day in a similar manner as described with respect to the lighting fixture 100. For example, the controller 508 may receive the current time information from the clock module 5106 in a similar manner as described above with respect to the controller 108 and the clock module 112 of FIG. 1. The controller 508 may control the amount of power that the driver 502 provides to each LED group of the light source 504 based on the time information received from the clock module 506 and a lighting control profile. For example, the lighting control profile may be a default profile or one of multiple profiles loaded into the controller 508 at the factory, a default profile or one of multiple profiles loaded and/or selected by an installer during installation, or a default profile or one of multiple profiles loaded and/or selected by a consumer after installation, for example, using a lighting control application of a mobile device.

In some alternative embodiments, the driver 502 may provide power to the light source 504 via a single electrical connection, and the current through each LED group may be controlled by the driver in a similar manner described with respect to FIG. 3. For example, the driver 502 may provide signals that control transistors for controlling the average current through each LED group. In some alternative embodiments, the lighting fixture 500 may include other components without departing from the scope of this disclosure. In some alternative embodiments, the clock 506 may be a soft clock as described above with respect to FIG. 1. In some example embodiments, a crystal, such as the crystal 402 of FIG. 4, may be used instead of the clock module 506, and the crystal and the controller 508 together may operate as a real time clock.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting fixture, comprising:
   a light emitting diode (LED) light source;
   a clock module; and
   a controller configured to control one or more characteristics of a light emitted by the LED light source based on time information received from the clock module, wherein the controller is configured to determine a current time of a day from the time information, wherein the controller is configured to interpret a sequence of toggles of a power provided to the lighting fixture as indicating a reference time of the day at a time of a detection of the sequence of toggles, and wherein the clock module is configured to keep track of the current time of the day starting from the reference time of the day.

2. The lighting fixture of claim 1, wherein the controller is configured to control the one or more characteristics of the light further based on a lighting control profile that indicates lighting characteristics information with respect to different times of the day.

3. The lighting fixture of claim 2, wherein the one or more characteristics of the light emitted by the LED light source includes a color temperature.

4. The lighting fixture of claim 2, wherein the one or more characteristics of the light emitted by the LED light source includes a dim level.

5. The lighting fixture of claim 1, wherein the clock module includes an atomic clock.

6. The lighting fixture of claim 1, wherein the clock module includes a real time clock circuit.

7. The lighting fixture of claim 1, wherein the clock module includes a soft clock and wherein the controller and the clock module keep track of the current time of the day based on a run clock provided to the controller.

8. The lighting fixture of claim 1, further comprising a battery that provides power to the clock module.

9. The lighting fixture of claim 1, wherein the controller is configured to interpret a second sequence of toggles of the power provided to the lighting fixture as indicating a second reference time of the day at a time of a detection of the second sequence of toggles and wherein the second reference time of the day is different from the reference time of the day.

10. The lighting fixture of claim 1, wherein the controller is configured to control the one or more characteristics of the light based on a signal received wirelessly by the lighting fixture.

11. A lighting fixture, comprising:
a light emitting diode (LED) light source;
a crystal; and
a controller configured to keep track of a current time of a day based on a signal from the crystal and to control one or more characteristics of a light emitted by the LED light source based on the current time of the day, wherein the controller is configured to interpret a sequence of toggles of a power provided to the lighting fixture as indicating a reference time of the day at a time of a detection of the sequence of toggles and wherein the controller is configured to keep track of the current time of the day starting from the reference time of the day.

12. The lighting fixture of claim 11, wherein the controller is configured to control the one or more characteristics of the light further based on a lighting control profile that indicates lighting characteristics information with respect to different times of the day.

13. The lighting fixture of claim 12, wherein the one or more characteristics of the light emitted by the LED light source includes a color temperature.

14. The lighting fixture of claim 12, wherein the one or more characteristics of the light emitted by the LED light source includes a dim level.

15. The lighting fixture of claim 11, further comprising a battery that provides power to at least a portion of the controller.

16. The lighting fixture of claim 11, wherein the controller is configured to interpret a second sequence of toggles of the power provided to the lighting fixture as indicating a second reference time of the day at a time of a detection of the second sequence of toggles and to keep track of the current time of the day based on the second reference time of the day and wherein the second reference time of the day is different from the reference time of the day.

17. A lighting fixture, comprising:
a light emitting diode (LED) light source configured to emit a light;
a clock module; and
an LED driver comprising a controller, wherein the LED driver is configured to provide power to the LED light source, wherein the controller is configured to control an amount of the power provided to the LED light source, wherein the controller is configured to control one or more characteristics of the light based on time information received from the clock module wherein the controller is configured to interpret a sequence of toggles of a source power provided to the lighting fixture as indicating a reference time of a day at a time of a detection of the sequence of toggles, and wherein the clock module is configured to keep track of a current time of the day starting from the reference time of the day.

18. The lighting fixture of claim 17, wherein the controller is configured to control the one or more characteristics of the light further based on a lighting control profile that indicates lighting characteristics information with respect to different times of a day.

19. The lighting fixture of claim 18, wherein the one or more characteristics of the light includes a color temperature.

20. The lighting fixture of claim 17, wherein the controller is further configured to interpret a second sequence of toggles of the source power provided to the LED driver between on and off as indicating a second reference time of the day at a time of a detection of the second sequence of toggles and wherein the second reference time of the day is different from the reference time of the day.

* * * * *